(12) United States Patent
Blaylock et al.

(10) Patent No.: US 6,705,456 B2
(45) Date of Patent: Mar. 16, 2004

(54) FEED INDEXING BAR CONVEYOR

(75) Inventors: Dan E. Blaylock, Russellville, AL (US); Don F. Lewis, Florence, AL (US)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/165,176

(22) Filed: Jun. 7, 2002

(65) Prior Publication Data

US 2003/0226741 A1 Dec. 11, 2003

(51) Int. Cl.[7] .............................................. B65G 25/04
(52) U.S. Cl. ................. 198/750.1; 144/242.1; 414/525.1; 83/404; 83/703; 83/435.11
(58) Field of Search .......................... 198/750.1, 750.2, 198/750.14, 621.1; 414/525.1, 525.7; 144/242.1, 245.1, 245.5, 245.7; 83/404, 703, 707, 435.11, 435.17

(56) References Cited

U.S. PATENT DOCUMENTS

| 4,180,109 | A |   | 12/1979 | Heikkinen |
| 4,374,533 | A |   | 2/1983 | Svensson |
| 4,709,805 | A |   | 12/1987 | Foster |
| 4,784,198 | A |   | 11/1988 | Pallmann |
| 5,063,981 | A |   | 11/1991 | Jonkka |
| 6,213,178 | B1 |   | 4/2001 | Jonkka et al. |
| 6,493,076 | B1 | * | 12/2002 | Laitinen ................. 356/237.2 |
| 6,516,843 | B2 | * | 2/2003 | Jonkka ........................ 144/342 |
| 6,526,154 | B1 | * | 2/2003 | Taipale et al. .............. 382/100 |
| 6,546,979 | B2 | * | 4/2003 | Jonkka ........................ 144/341 |

FOREIGN PATENT DOCUMENTS

WO      WO 00/40383      7/2000

OTHER PUBLICATIONS

"GentleFeed™ System for a Barking Drum", Metso Paper brochure, 6 pp.

* cited by examiner

Primary Examiner—Richard Ridley
(74) Attorney, Agent, or Firm—Stiennon & Stiennon

(57) ABSTRACT

A conveyor between a log debarker and a flaker has three flat bottom plates which extend the length of the conveyor line, and two vertical side plates. Each of the five plates is driven to oscillate by a hydraulic piston. All five plates together move forward approximately 30 inches at a constant velocity, after the completion of the forward motion, each plate is retracted separately at approximately three times the velocity of the forward motion, to advance logs retained within a trough defined between the side plates in a stepwise forward motion.

8 Claims, 4 Drawing Sheets

FEED INDEXING BAR CONVEYOR

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to conveyors in general and to conveyors for moving logs in particular.

Oriented chips or wafers of wood are used to construct oriented strandboard which has several structural and cost advantages over plywood. The strandboard is a truly modern composite material where the orientation of wood fibers in the wafers making up the board can be engineered to give the board desired properties of stiffness and strength. As compared to plywood, strandboard is more efficient at utilizing all the wood fiber present in relatively small diameter logs, and thus is lower cost them plywood. Moreover, strandboard is without the voids typically present in lower grades of plywood. Strandboard is manufactured from wood wafers cut by a flaker from debarked logs. The debarked logs are advanced along the long axes of the logs approximately 30 inches into the flaker. The logs are held fixed while the blades of the flaker, which extend parallel to the axes of the logs, are caused to rotate about a line parallel to the axis of the logs but displaced from the logs, to thereby reduce a 30-inch portion of the logs to wafers. The wafers are thin veneer-like wood chips or flakes which are used to form the oriented strandboard. Existing feed mechanisms between a debarker, in which the bark is removed from the logs, and the flaker typically employ two separate chain conveyors which operate by indexing the logs forward than pausing while the flaker makes its cutting stroke and then retracts.

Chain drives, while widely used for conveying logs, have several disadvantages, particularly where used to feed a flaker. Maintenance costs are higher than is desirable, as the weight and force with which logs can impact the drive systems results in the expenses of down time for repairs. Further, the cycle of advancing, pausing while the flaker makes its cutting stroke, and advancing again is less than ideally suited to the chain drive with the result that energy costs are higher than necessary.

What is needed is a conveying system of greater reliability, lower cost, and greater efficiency for feeding logs between a debarker and a flaker

SUMMARY OF THE INVENTION

The conveyor system of this invention extends between a log debarker and a flaker. The conveyor has five plates that are arranged within a conveying trough. The plates are continuous and extend the length of the conveyor. Three plates line the bottom of the conveyor trough and are supported on rollers, and two plates are positioned vertically on either side of the trough bottom to form approximately the lower half of the trough sides. The vertical plates forming the sides rest within C-channels lined with ultra high molecular weight plastic. Each of the five plates is driven with a hydraulic piston. In operation, all five plates together move forward approximately 30 inches at a constant velocity, and then each plate is retracted separately. The motion of the plates is such that the static coefficient of friction holds the logs against the plates during the forward stroke, but the dynamic coefficient of friction, which is lower than the static coefficient of friction, allows the plates to slide with respect to the logs resting thereon. The effect is a stepwise advance of the logs from the inlet to the outlet of the conveyor. Also, because the logs typically are held in contact with other logs when a single plate is retracted, the logs resting on or against the plate are held from reverse motion by the other logs which are engaged with the non moving plates. Because the plates are moved by simple hydraulic pistons which are ideally suited for discontinuous motion, energy usage as compared to a chain drive conveyor is reduced and the required drive power is substantially reduced to approximately 40 percent, of the installed horsepower of a comparable chain drive conveyor. The stroke and timing of the piston movements are easily controlled by a hydraulic control system which, for optimum reconfiguration, may be controlled by a programmable logic controller, or may use simple cam driven timing mechanisms.

It is an feature of the present invention to provide a conveying system between a log debarker and a flaker which is more reliable and of lower cost.

It is a further feature of the present invention to provide a conveying system between a log debarker and a flaker which has lower operating costs, and lower energy usage.

It is another feature of the present invention to provide a conveying system optimized for moving logs between a debarker and a flaker.

Further objects, features and advantages of the invention will be apparent from the following detailed description when taken in conjunction with the accompanying drawings.

DESCRIPTION OF THE PREFERRED EMBODIMENTS

Figure 1:
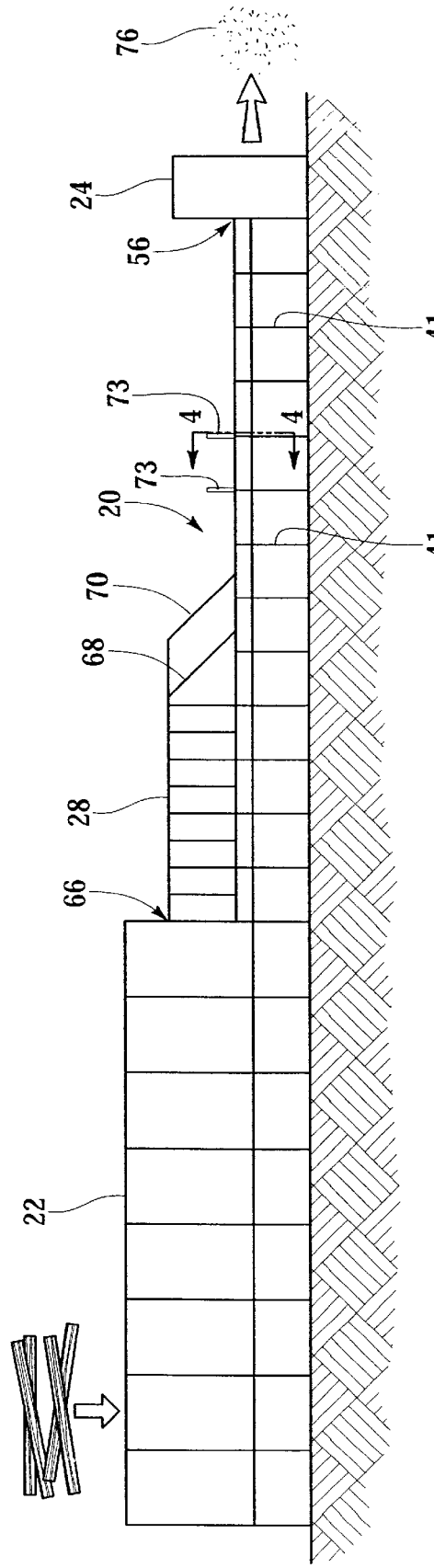
FIG. 1 is a schematic side elevational view of a debarker and flaker connected by the conveyor of this invention.

Referring more particularly to FIGS. 1–4, wherein like numbers refer to similar parts, a log conveyor 20 is shown in FIG. 1. The conveyor 20 extends between a debarker 22 and a flaker 24. Logs 26 are fed into the debarker 22 where the outer bark is removed from the logs. The logs 26 travel along the conveyor 20 advancing approximately 30 inches toward the flaker 24. The logs 26 are clamped in the flaker 24, and blades within the flaker 24 reduce a thirty-inch section of the logs to wood wafers or chips which are used to make strandboard or other wood products. Typically, this takes approximately seventeen seconds, after which the clamp within the flaker 24 is released and the logs are again indexed forward thirty inches and the process is repeated.

Figure 3:
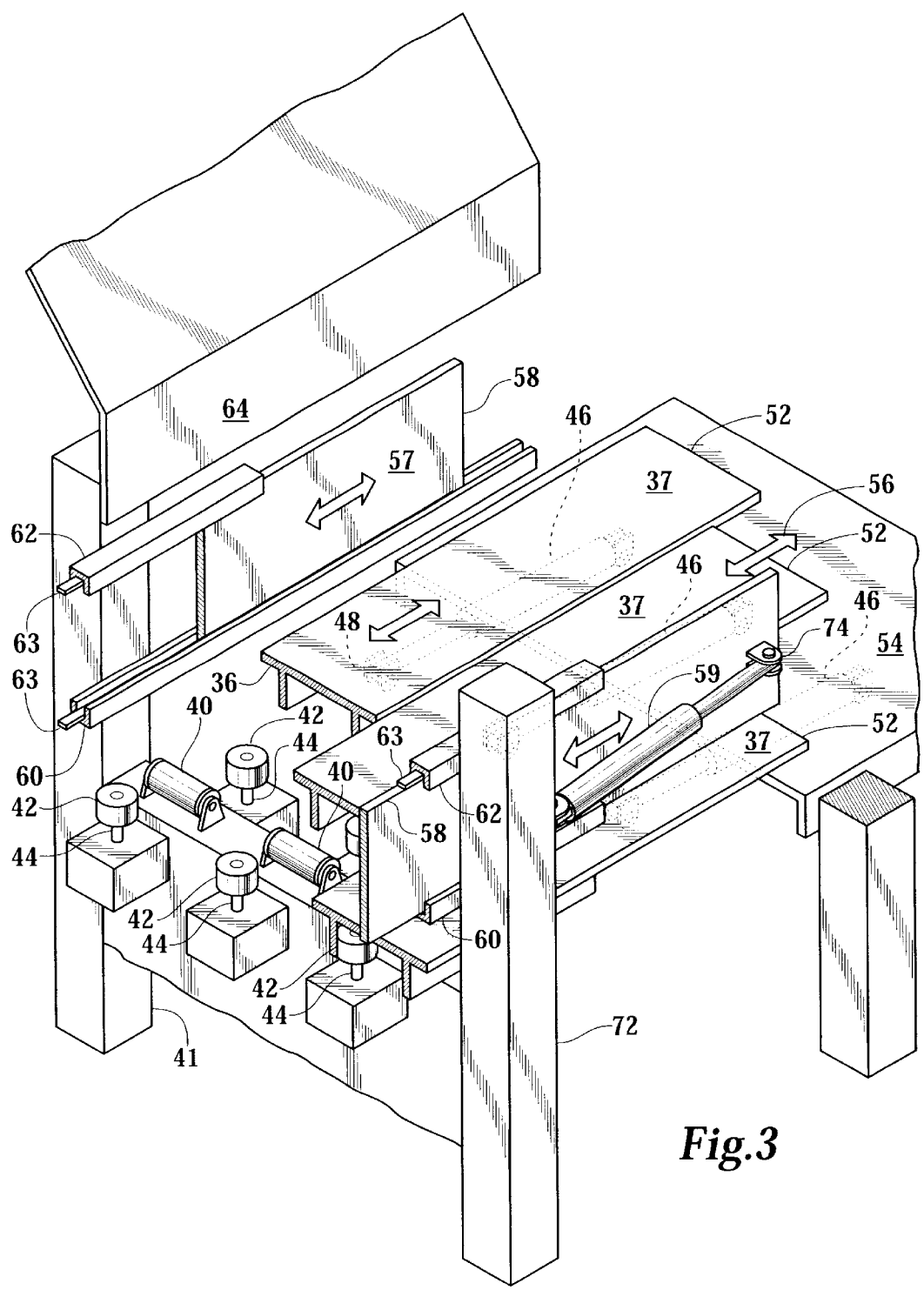
FIG. 3 is a fragmentary isometric view, partially broken away in section, of the discharge end of the conveyor which leads into the flaker of FIG. 1.

The conveyor 20 has a log receiving section 28 which receives logs 26 from the debarker 22. The log receiving section 28 is as wide as the debarker and has a more narrow rectangular trough 30 which has two vertical sides 32 and a horizontal bottom 34. The conveyor 20 is of the reciprocating floor or walking floor type. The bottom or floor 34 of the conveyor trough 30 is composed of three plate members 36 having flat upper surfaces 37. The plate members 36 extend the length of the conveyor 20, which may be over one hundred feet long and are each about 20 inches wide. Each plate member 36 has a pair of downwardly extending flanges 38 which are about six and one-half inches deep. Between the flanges 38, roller bearings 40 support the plate members 36. The roller bearings 40 are mounted to transverse frames 41 which are spaced approximately nine-and-one-half feet on center along the length of the conveyor 20. Staggered longitudinally on either side of the roller bearings 40 are centering rolls 42 which have internal bearings (not shown) which support the rolls 42 on bearing posts 44. The rolls 42 position the plate members 36 laterally. The plate members 36 are constructed of heavy gauge steel, for example three-quarters of an inch, and are spaced apart approximately one-quarter of an inch. As shown in FIG. 3, each plate member 36 forms a beam which is driven by a hydraulic actuator 46. The hydraulic actuator extends between a bracket 48 mounted to the underside of each plate 36 and a support frame 50 which leads into the flaker 24. The hydraulic actuators 46 cause the plate members 36 to reciprocate. The ends 52 of the plates 36 overlap a horizontal fixed plate 54 adjacent to the in-feed 56 of the flaker 24.

The vertical sides 32 of the conveyor trough 30 have vertical plate members 58 which are mounted between lower C-channels 60 and upper C-channels 62. The lower and upper C-channels are lined with Ultra High Molecular Weight (UHMW) plastic 63 or other low friction material. The vertical plate members 58 have flat inwardly facing surfaces 57 and are constructed of heavy gauge steel, for example three-quarter inch plate steel, and are continuous from one end of the conveyor 20 to the other. The vertical side plate members 58 are caused to move by hydraulic actuators 59 which are mounted between support frames 72, and brackets 74 on the side plate members 58.

Figure 2:
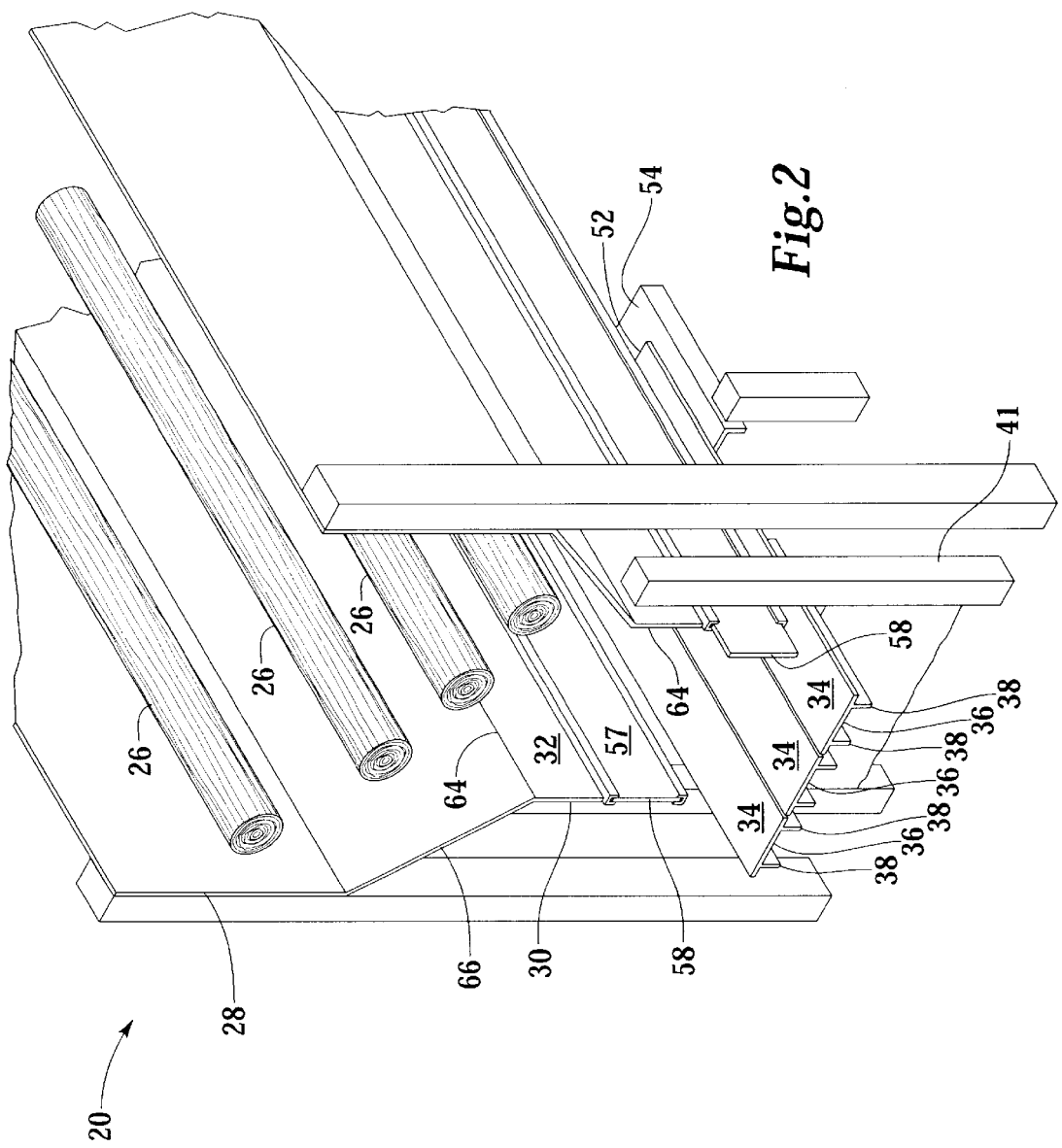
FIG. 2 is an isometric view of the inlet of the conveyor of FIG. 1 where logs are received from the debarker.

Above the moving vertical plate members 58 are fixed side wall sections 64, and at the inlet 66 of the conveyor 20, the receiving section 28 extends upwardly and outwardly from the fixed wall sections 64 as shown in FIG. 2. As shown in FIGS. 1 and 2, the receiving section 28 directs the logs 26 into the narrow trough 30, with first one side 68 and then the other side 70 of the receiving section 28 directing the logs 26 into the trough, in the manner known to those skilled in the art to prevent the jamming of logs.

Figure 4:
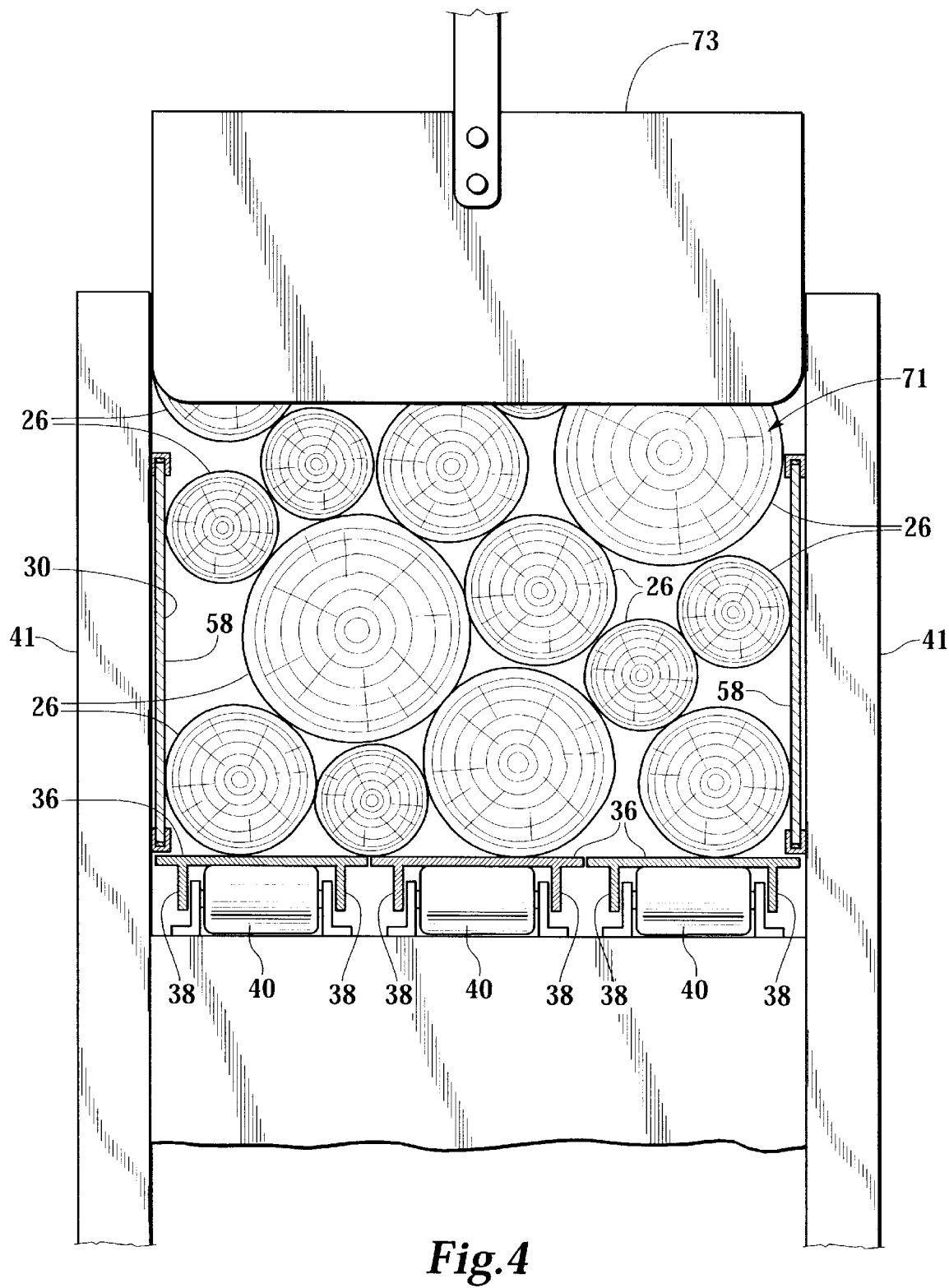
FIG. 4 is a cross-sectional view taken along section line 4—4 of FIG. 1.

The conveyor 20 is particularly well adapted to fulfill the requirements of transporting logs 26 between the debarker 22 and the flaker 24. The flaker 24 has a rather narrow region of optimal cutting and so the logs which are fed to the flaker 24 should have a compact cross-section as shown in FIG. 4. The narrow trough 30 of the conveyor 20 is adapted to be filled to form a compact mass 71 of logs 26. Gates 73, as shown in FIG. 4, are positioned along the trough 30 as shown in FIG. 1 to control the height of the stack of logs. The gates 73 may be arranged and various heights to progressively bring the log stack to the desired height. The hydraulic actuators 46, 59 move together at a first velocity to draw the plates 36, 58 toward the in-feed 56 of the flaker 24, thus drawing a compact mass of logs into the flaker 24 an amount proportional to the stroke of the hydraulic actuators 46, 59, for example about 30 inches. A hydraulic clamp or the like (not shown) which typically forms part of the flaker 24 clamps the logs in place while the flaker 24 makes the cutting stroke which reduces the portion of the logs which extends into the flaker 24, into wafers or chips 76. The cutting stroke of the flaker, depending on the design of the flaker, may take approximately seventeen seconds.

During the cutting stroke while the logs are clamped in the flaker, individual plate members 36, 58 are moved away from the flaker inlet one at a time. The frictional engagement between the logs and the nonmoving plate members serves to hold the logs in place while single plate members are moved away from the flaker inlet. In addition, more rapid movement away from the flaker inlet could be used, however if the logs are clamped rapid movement to produce a lower coefficient of friction is not necessary.

There is a synergism between the design of the conveyor 20 and the need to present the flaker 24 with a compact mass 71 of logs. In typical prior art walking floor type conveyors the moving floor members are arranged in upwardly opening convex configuration with the object of transporting material without binding of the logs or other material. The conveyor 20, in order to position the logs 26 for reduction to wafers in the flaker, places the logs in a compact rectangular shape. As shown in FIG. 4, the gate 73 restricts the height of the log stack to about two feet, where the trough 30 has a width of four and one-half feet to form a compact arrangement of the logs 26. The compact arrangement necessarily results in fictional engagement of the trough walls, which are also moving components 58 in the conveyor 20.

It should be understood that the vertical plate members 58 could be mounted on roller bearings instead of the illustrated low friction bearings or that the low friction plastic inserts 63 at the bottoms of the C-channels 60 as shown could be C-shaped themselves so as to completely line the C-channels 60.

It should be understood that the vertical plate members 58 could be stiffened by flanges on the side of the plate opposite the trough 30. It should further be understood that the dimensions described are by way of example, and that the conveyor may be variously configured depending on the output of the debarker 22 and the capabilities of the flaker 24. It should further be understood that the gates 73 may have various configurations such as is conventionally used with prior art chain conveyors.

It should also be understood that depending upon the number of plate members 34, 58 two or more plate members could be retracted simultaneously particularly if the logs are held clamped within the flaker 24.

It is understood that the invention is not limited to the particular construction and arrangement of parts herein illustrated and described, but embraces all such modified forms thereof as come within the scope of the following claims.

We claim:

1. A log processing system comprising:
   a log debarker discharging into a conveyor, the conveyor discharging into a flaker, the conveyor defining a direction of conveyance between the debarker and the flaker;
   wherein the conveyor has a rectangular log receiving trough defining a trough bottom perpendicular to two vertically extending trough sides;
   wherein the trough bottom is comprised of a plurality of horizontal beams with flat upper surfaces lying in substantially a single plane which extend substantially along the length of the conveyor, each horizontal beam being mounted for reciprocating motion in the direction of the conveyor; and
   wherein each vertically extending trough side is a vertically extending beam with a flat inwardly facing surface, each vertically extending beam being mounted for reciprocating motion in the direction of the conveyor.

2. A log processing system comprising:

a log debarker discharging into a conveyor, the conveyor discharging into a flaker, the conveyor defining a direction of conveyance between the debarker and the flaker;

wherein the conveyor has a log receiving trough defining a trough bottom substantially perpendicular to two vertically extending trough sides;

wherein the trough bottom is comprised of a plurality of horizontal beams with flat upper surfaces lying in substantially a single plane which extend substantially along the length of the conveyor, each horizontal beam being mounted for reciprocating motion in the direction of the conveyor;

wherein each vertically extending trough side has at least one vertically extending beam with a flat inwardly facing surface, each vertically extending beam being mounted for reciprocating motion in the direction of the conveyor; and at least one transverse gate positioned on the conveyor extending between the two vertical extending trough sides and spaced from the flaker so as to limit the height of logs within the rectangular log receiving trough as the conveyor approaches the flaker.

3. A method of conveying logs between a debarker and a flaker, the method comprising the steps of:

discharging debarked logs onto a substantially rectangular conveyor trough, wherein the trough has a substantially planar bottom formed of a plurality of plate members mounted for reciprocal motion, and two sides formed in part by vertical plates mounted for reciprocal motion;

conveying a plurality of logs toward the flaker by advancing the plurality of plate members, and the plurality of vertical plate members simultaneously toward the flaker, until a first plurality of logs extends a selected distance into the flaker;

clamping said first plurality of logs against motion, and operating the flaker until a selected portion of each log extending into the flaker has been reduced to wood wafers;

retracting less than all of the plurality of plate members and the plurality of vertical plates away from the flaker; and again advancing the plurality of plate members, and the plurality of vertical plate members simultaneously in the direction of the flaker, until logs extend the selected distance into the flaker.

4. The method of claim 3 wherein the plurality of plate members and the plurality of vertical plates are retracted one at a time away from the flaker.

5. The method of claim 3 further comprising the step of removing logs which extend above a selected height within the rectangular conveyor trough by means of a transverse member which extends between nonmoving portions of the two sides.

6. A conveyor between a log debarker and a flaker comprising:

a frame extending between the log debarker and the flaker, the frame defining an axis of movement from the log debarker to the flaker;

a plurality of bottom members mounted to the frame for reciprocating motion along the axis of movement, wherein each bottom member has a bottom actuator mounted thereto, each bottom actuator extending between the frame and the bottom member to which it is mounted, and wherein each bottom member has a conveying surface extending substantially in a single horizontal plane;

a first side member mounted to the frame for reciprocating motion along the axis of movement, the first side member having only vertically extending conveying surfaces which are substantially perpendicular to the bottom members;

a first side actuator mounted to the first side member and operable to cause the reciprocating motion of the first side member;

a second side member mounted to the frame for reciprocating motion along the axis of movement and having vertical conveying surfaces parallel to the first side conveying surfaces; and a second side actuator mounted to the second side member and operable to cause the reciprocating motion of the second side member, wherein the plurality of bottom members are positioned between the first side member and the second side member to define a conveying trough therebetween, such that logs may be received within the conveying trough for advancement from the log debarker to the flaker.

7. A conveyor between a log debarker and a flaker comprising:

a frame extending between the log debarker and the flaker, the frame defining an axis of movement from the log debarker to the flaker;

a plurality of bottom members mounted to the frame for reciprocating motion along the axis of movement, wherein each bottom member has a bottom actuator mounted thereto, each bottom actuator extending between the frame and the bottom member to which it is mounted, and wherein each bottom member has a conveying surface extending substantially in a horizontal plane;

a first side member mounted to the frame for reciprocating motion along the axis of movement, the first side member having a conveying surface which extends substantially vertically;

a first side actuator mounted to the first side member and operable to cause the reciprocating motion of the first side member;

a second side member mounted to the frame for reciprocating motion along the axis of movement and substantially parallel to the first side member; and a second side actuator mounted to the second side member and operable to cause the reciprocating motion of the second side member, wherein the plurality of bottom members are positioned between the first side member and the second side member to define a conveying trough therebetween, such that logs may be received within the conveying trough for advancement from the log debarker to the flaker;

a first downwardly opening C-channel mounted to the frame above the first side member; and a second upwardly opening C-channel mounted to the frame below the first side member, wherein the first side member is engaged with the first C-channel and the second C-channel and is constrained thereby to move along the axial direction.

8. The conveyor of claim 7 further comprising a first gate mounted to the frame and extending across the conveying trough, the first gate having a lower edge which is spaced a first height above the plurality of bottom members to define a passageway between the plurality of bottom members and the lower edge of the first gate through which logs may pass, but restraining logs from passage along the trough which extend higher than the first height.

* * * * *